United States Patent [19]
Hashioka

[11] 3,893,774
[45] July 8, 1975

[54] PIPE CONNECTOR
[76] Inventor: Noriyasu Hashioka, Nishigahara 1-chome, Kita-ku, Tokyo, Japan
[22] Filed: Nov. 2, 1973
[21] Appl. No.: 412,274

[30] Foreign Application Priority Data
Nov. 7, 1972 Japan............................ 47-128311

[52] U.S. Cl................................. 403/171; 211/182
[51] Int. Cl................................................ E04b 7/08
[58] Field of Search .......... 403/171, 172, 176, 295, 403/174; 211/182; 52/758 H, 656, 637, 638

[56] References Cited
UNITED STATES PATENTS
3,255,721  6/1966  Peterschmidt ................. 403/172 X
3,407,561  10/1968  Peacock ............................. 52/656
3,645,569  2/1972  Reilly ............................. 52/758 H
3,666,298  5/1972  Reilly ............................. 403/298 X
3,731,958  5/1973  Offenbroich ..................... 52/656 X FOREIGN PATENTS OR APPLICATIONS
1,067,361  5/1967  United Kingdom ................ 403/174
1,471,179  1/1967  France ........................... 403/174

*Primary Examiner*—Geo V. Larkin
*Attorney, Agent, or Firm*—George B. Oujevolk

[57] ABSTRACT

This invention relates to pipe connectors for connecting square pipes in three dimensions to form show cases or article display stands, etc.

3 Claims, 8 Drawing Figures

PIPE CONNECTOR

SUMMARY OF THE INVENTION

Generally speaking, the present invention contemplates a two-piece pipe connector for connecting square pipes to form a finished structure comprising a cube-like base piece with connecting legs as well as a disk-like head and a locking sleeve having an open end and a rectangular end sized to enter a square pipe. The open end receives the disk-like head.

BRIEF DESCRIPTION OF THE DRAWINGS

The accompanying drawings show some embodiments of the pipe connectors according to this invention, in which.

DETAILED DESCRIPTION OF THE INVENTION

Figure 1:
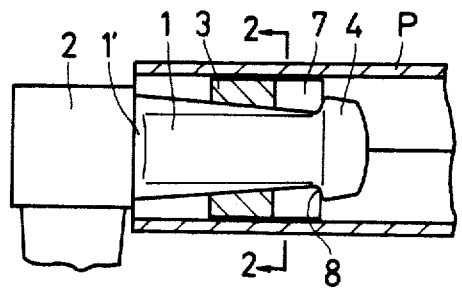
FIG. 1 is a longitudinal section of a pipe connector before being connected.
Figure 2:
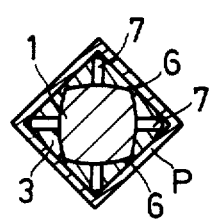
FIG. 2 is a section along the line 2 — 2 of FIG. 1.
Figure 3:
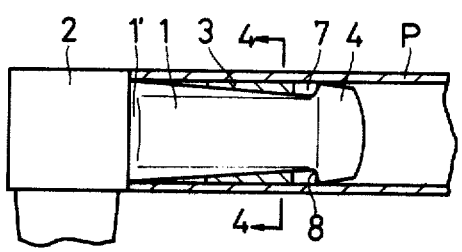
FIG. 3 shows a longitudinal section of the connector when completely connected.
Figure 4:
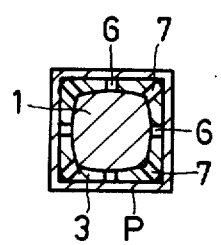
FIG. 4 is a section along the line 4 — 4 of FIG. 3.
Figure 5:
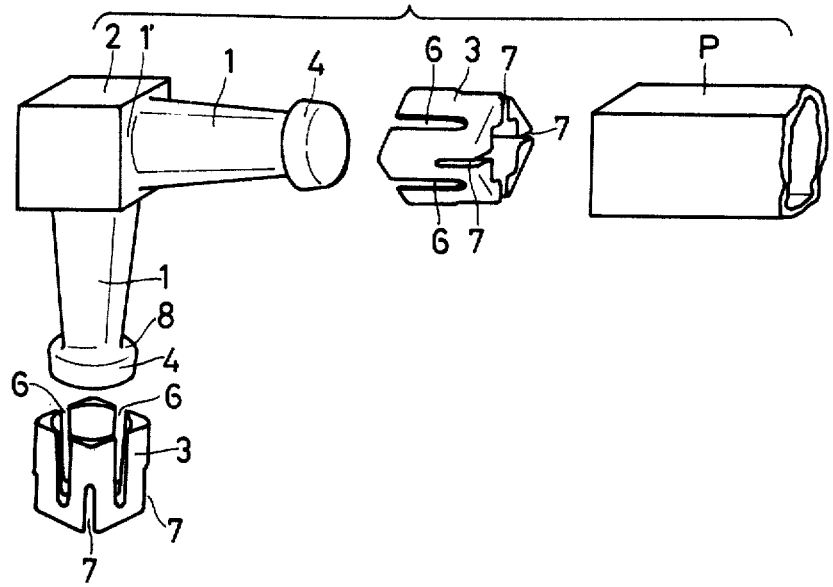
FIG. 5 is an exploded perspective view of the composing members.

This invention is particularly useful with connectors to be used for connecting pipes in three dimensions when displaying relatively small-sized articles for sale so that one of the principle objects of the present invention is to provide connectors capable of connecting pipes firmly and securely and which are easy to manufacture.

The present invention consists of a rectangularly shaped body serving as a connector 2 with connecting leg 1 having a polygonal cross-section and projecting from connector body 2. Connecting legs 1 project from connector 2 at right angles to each other. The connecting legs are convergent in form with an enlarged disk-like head 4 at the free end, and a polygonal locking sleeve 3 formed of elastic material such as synthetic resin is inserted over the tapered portion of leg 1 and secured by head 4. Locking sleeve 3 is formed with the contour shaped to conform to the inside form of pipe P and also formed with radial slits 6 and 7, the slits serving for expansion of sleeve 3, that is, slit 6 assisting sleeve 3 to be forced smoothly over connecting leg 1, and slit 7 serving to receive a connecting pipe thereover.

Connecting leg 1 is square in section and has its four sides somewhat rounded outwardly. Locking sleeve 3 which has the same shape as the leg 1 serves with its arched surface for the smooth connection of pipe P when the latter is inserted thereover and rotated 45° for locking.

Connecting leg 1 has at its base 1' a rounded portion adapted to conform to the inside diameter of pipe P, the rounded portion serving to prevent the pipe from being displaced after it has been connected. Locking sleeve 3 also is tapered at the inside so as to match the body surface of the connecting leg and the outer surface is so shaped that it will conform to the inside of pipe P so as not to be inclined. Boundary portion 8 between head 4 and connecting leg 1 is curved in an arc form in section and when the pipe is rotated 45°, the locking sleeve 3 rotates smoothly so that pressing force therearound will be increased.

Figure 6A:
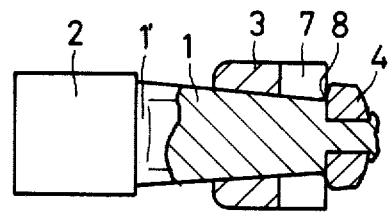
FIG. 6A and 6B represents in section a modification of the connecting legs.
Figure 6B:
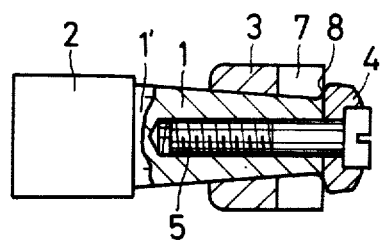
Figure 7:
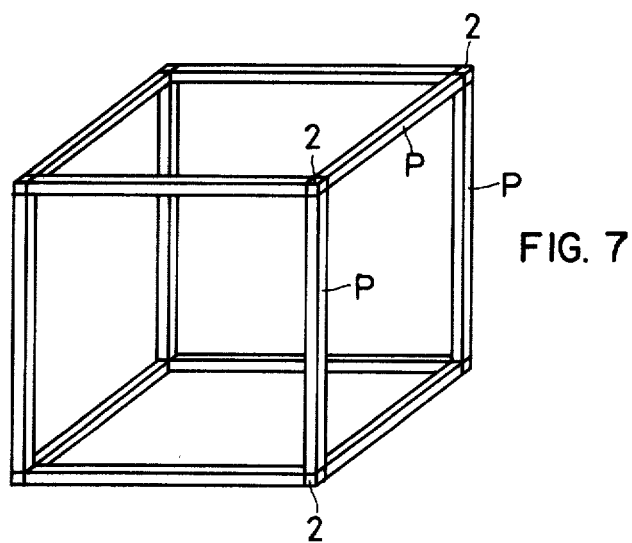
FIG. 7 is a perspective view of a display case assembled by using pipe connectors of the present invention.

Also, as shown in FIG. 6(A), connecting leg 1 may have at its free end enlarged head 4 caulked thereon or fixed by screw 5 as shown in FIG. 6(B).

In the assembly shown in FIG. 1, locking sleeve 3 is forced over the connecting leg and firmly secured thereon, and in the assembled connectors shown in FIGS. 6A and 6B, enlarged head 4 is fixed thereon after locking sleeve 3 has been inserted.

As shown in the embodiments in the drawing, not only square pipes, but also non-circular ones, that is pipes with an oval cross section can be connected, and furthermore, round pipes with engaging projections provided inside thereof may also be connected without difficulties. Also, any bar having outward openings at its both free ends can be connected as well.

Since the invention is composed as described above, when the end portion of pipe P is inserted over connecting leg 1 of connector 2 and rotated 45° part of locking sleeve 3 is enlarged outwardly so as to be pressed firmly against the inside surface of connecting pipe P so that pipe P is securely fixed to connector 2, said locking sleeve being made of substantial and elastic material such as nylon, etc. The slots, i.e., slits 6 and 7, expand and the interconnection between the joined members is greatly enhanced.

In short, pipe connectors of the present invention can be used to connect pipes with extreme ease, accurately and firmly, and can be handled by anyone without difficulty.

What is claimed is:

1. A two-piece pipe connector for connecting square pipes to form a finished structure wherein
   a. a first member comprises a cube-like base piece (2) with at least two connecting legs (1) each leg having an elongated body portion said body portion being connected to said cube-like base at one end and outwardly tapered therefrom to a free end with a disk-like head (4) portion at said free end; and,
   b. a second member comprises a locking sleeve (3) having an open end and a rectangular end designed and sized to enter a square pipe open end, four walls extending from said rectangular end having a rounded interior conforming to the shape of said head, at least two end slots along at least two junctions of said four walls and at least two inner slots extending along the centers of at least two walls, so that said second member can be inserted into a square pipe and one head of said first member can be inserted into said second member open end.

2. A pipe connector as claimed in claim 1 having four end slots, one at each junction of said walls and four inner slots, one on each wall.

3. A pipe connector as claimed in claim 2 including a curved boundry portion (8) between said head (4) and connecting leg (1) said curved boundry portion serving to lock the leg into the sleeve (3).

* * * * *